(12) United States Patent
Osterberg et al.

(10) Patent No.: US 9,302,703 B2
(45) Date of Patent: Apr. 5, 2016

(54) ELECTRO-HYDRAULIC POWER STEERING

(71) Applicant: HB Performance Systems, Inc., Mequon, WI (US)

(72) Inventors: Tim Osterberg, Mequon, WI (US); Kurt W. Person, Cedarburg, WI (US)

(73) Assignee: HB Performance Systems, Inc., Mequon, WI (US)

( * ) Notice: Subject to any disclaimer, the term of this patent is extended or adjusted under 35 U.S.C. 154(b) by 0 days.

(21) Appl. No.: 14/038,111

(22) Filed: Sep. 26, 2013

(65) Prior Publication Data
US 2014/0083793 A1   Mar. 27, 2014

Related U.S. Application Data

(60) Provisional application No. 61/831,826, filed on Jun. 6, 2013, provisional application No. 61/705,992, filed on Sep. 26, 2012, provisional application No. 61/705,989, filed on Sep. 26, 2012.

(51) Int. Cl.
| | |
|---|---|
| *B62D 5/06* | (2006.01) |
| *B62D 5/08* | (2006.01) |
| *B62D 5/18* | (2006.01) |
| *B62D 5/065* | (2006.01) |
| *B62D 5/09* | (2006.01) |
| *B62K 5/08* | (2006.01) |

(52) U.S. Cl.
CPC *B62D 5/08* (2013.01); *B62D 5/065* (2013.01); *B62D 5/09* (2013.01); *B62D 5/18* (2013.01); *B62K 5/08* (2013.01)

(58) Field of Classification Search
CPC ............. B62D 5/08; B62D 5/065; B62D 5/09
USPC .......... 180/421, 422, 433, 434, 441, 414, 415
See application file for complete search history.

(56) References Cited

U.S. PATENT DOCUMENTS

| | | | | |
|---|---|---|---|---|
| 4,311,006 | A * | 1/1982 | Becker | 60/385 |
| 4,586,582 | A * | 5/1986 | Duffy | 180/422 |
| 6,568,499 | B2 * | 5/2003 | Nakazawa et al. | 180/422 |
| 8,490,742 | B2 * | 7/2013 | Kobayashi | 180/422 |
| 2007/0251753 | A1 * | 11/2007 | Clausen | 180/414 |

* cited by examiner

*Primary Examiner* — Tony Winner
*Assistant Examiner* — Marlon Arce
(74) *Attorney, Agent, or Firm* — Michael Best & Friedrich LLP

(57) ABSTRACT

A hydraulic steering assist assembly is provided for a vehicle with a mechanical steering assembly operable by a user to steer the vehicle. The hydraulic steering assist assembly includes a hydraulic actuator adapted to be coupled to the mechanical steering assembly and has a first side and a second side. A bi-directional hydraulic pump is placed in fluid communication with the first side and the second side of the hydraulic actuator. The hydraulic steering assist assembly further includes a valve in fluid communication with the first side and the second side of the hydraulic actuator, and a control system for controlling the bi-directional hydraulic pump and the valve. The bi-directional hydraulic pump provides a pressurized fluid to the hydraulic actuator, which applies a force on the mechanical steering assembly to assist steering the vehicle. The valve can act as a steering damper.

11 Claims, 5 Drawing Sheets

ELECTRO-HYDRAULIC POWER STEERING

BACKGROUND

The present invention relates generally to power steering, and more specifically to electro-hydraulically assisted power steering on off-road vehicles including UTVs, ATVs, snowmobiles, and lawn and garden equipment.

When driving an off-road vehicle, it is often necessary to perform turns or steering maneuvers in rough terrain. These steering or turning events can be difficult for the driver to accomplish without the assistance of power steering. Purely mechanical steering linkages are subject to large transient loading with little or no damping and can have undesirable failure modes as a result.

SUMMARY

In one embodiment, the invention provides a hydraulic steering assist assembly for a vehicle with a mechanical steering assembly operable by a user to steer the vehicle. The hydraulic steering assist assembly includes a hydraulic actuator adapted to be coupled to the mechanical steering assembly and has a first side and a second side. A bi-directional hydraulic pump is placed in fluid communication with the first side and the second side of the hydraulic actuator. The hydraulic steering assist assembly further includes a valve in fluid communication with the first side and the second side of the hydraulic actuator, and a control system for controlling the bi-directional hydraulic pump and the valve. The bi-directional hydraulic pump provides a pressurized fluid to the hydraulic actuator, which applies a force on the mechanical steering assembly to assist steering the vehicle. The valve can act as a steering damper.

In another embodiment, the invention provides a hydraulic steering assist assembly for a vehicle with a mechanical steering assembly operable by a user to steer the vehicle. The hydraulic steering assist assembly includes a hydraulic actuator adapted to be coupled to the mechanical steering assembly and has a first side and a second side. A first valve is placed in fluid communication with the first side of the hydraulic actuator, and a second valve is placed in fluid communication with the second side of the hydraulic actuator. The hydraulic steering assist assembly further includes a hydraulic accumulator in fluid communication with the first valve and the second valve, and a hydraulic pump in fluid communication with the hydraulic accumulator. In addition, a control system is provided for controlling the hydraulic pump, the first valve, and the second valve. The accumulator provides a source of pressurized fluid to the hydraulic actuator.

In another embodiment, the invention provides a hydraulic steering assist assembly for a vehicle with a mechanical steering assembly operable by a user to steer the vehicle. The hydraulic steering assist assembly includes a hydraulic actuator adapted to be coupled to the mechanical steering assembly and has a first side and a second side. A reservoir contains a hydraulic fluid, and a bi-directional hydraulic pump is placed in fluid communication with the first side and the second side of the hydraulic actuator and the reservoir. The hydraulic steering assist assembly further includes a bypass circuit in fluid communication with the first side and the second side of the hydraulic actuator and the bi-directional hydraulic pump, and a control system for controlling the bi-directional hydraulic pump and the bypass circuit. The bi-directional hydraulic pump provides a pressurized fluid to the hydraulic actuator, which applies a force on the mechanical steering assembly to assist steering the vehicle.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
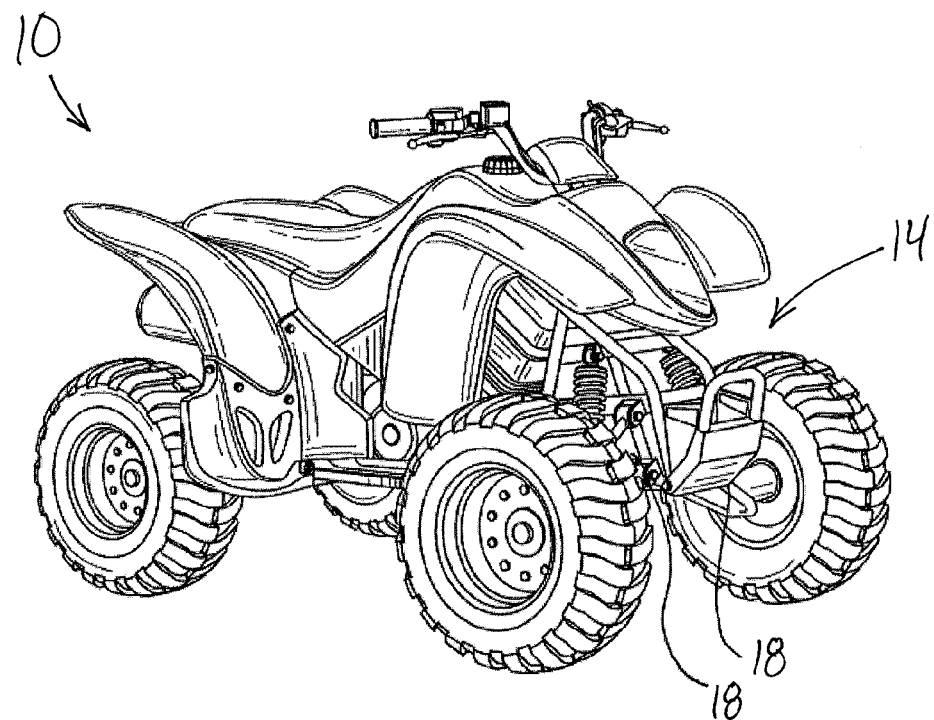
FIG. 1 illustrates an All-Terrain Vehicle (ATV) on which the present invention is utilized to provide electro-hydraulic power assist.

FIG. 1 illustrates an ATV 10 on which the present invention can be utilized to provide power steering assistance to a mechanical steering assembly 14 operable by a user to steer the vehicle 10 via steering linkages 18. The present invention can be utilized to provide power steering assistance on off-road vehicles including UTVs, ATVs, snowmobiles, and lawn and garden equipment, and can be integrated with different types of mechanical steering assemblies (e.g., a steering rack assembly, a bell crank steering assembly, etc.).

Figure 2:
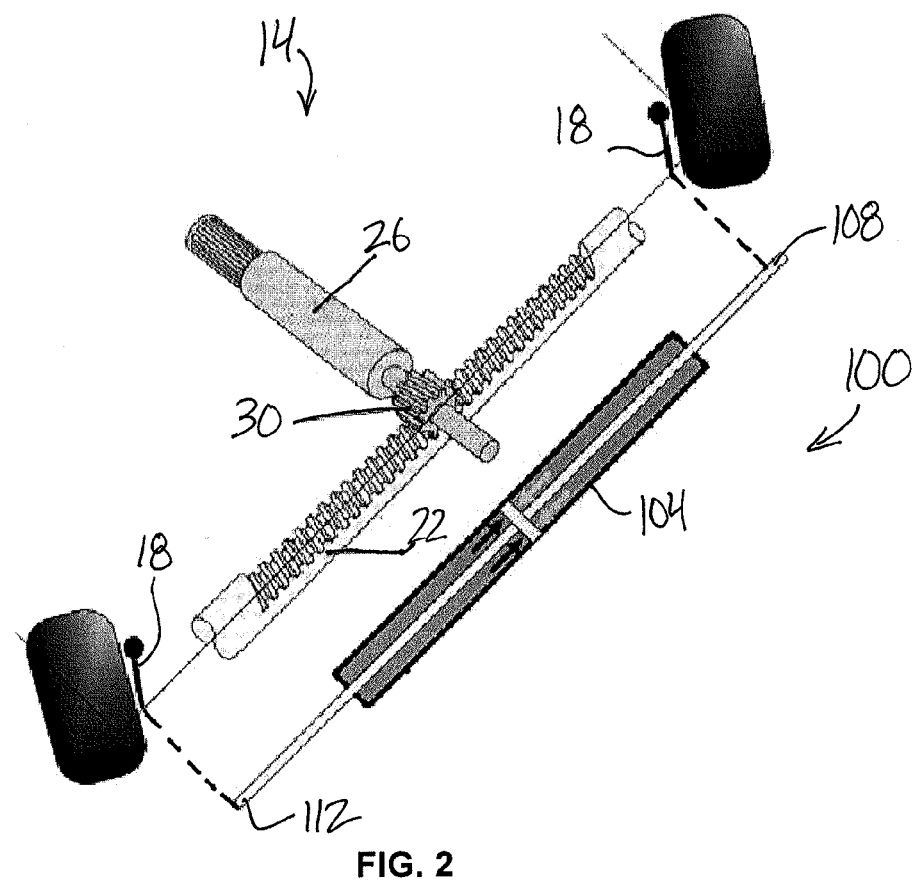
FIG. 2 is a system diagram showing a hydraulic actuator coupled to a mechanical steering assembly.

FIG. 2 illustrates as schematic of the mechanical steering assembly 14 including the steering linkages 18 coupled to a steering rack 22. The mechanical steering assembly 14 further includes a steering shaft 26 rotatable by a user and coupled to the steering rack 22 by a pinion gear 30. The traditional mechanical steering shaft 26 transmits torque to the pinion gear 30 causing the steering rack 22 to translate. The translation of the steering rack 22 causes movement of the steering linkages 18, which steers the vehicle 10.

A hydraulic steering assist assembly 100 includes a two-way hydraulic actuator 104 coupled in parallel to the steering rack 22. The hydraulic actuator 104 assists the steering rack 22 by transmitting force created by hydraulic pressure to the steering linkages 18 so that a reduced amount of torque is needed from the steering shaft 26 (i.e., the user's input) to steer the vehicle 10. The illustrated hydraulic actuator 104 has a first end 108 coupled to one steering linkage 18, and a second end 112, opposite the first end 108, coupled to another different steering linkage 18. Pressure can be applied to either side of the actuator 104 to provide turning assistance in both directions. Alternatively, the hydraulic actuator can have a single rod that is coupled to only one of the steering linkages.

Figure 3:
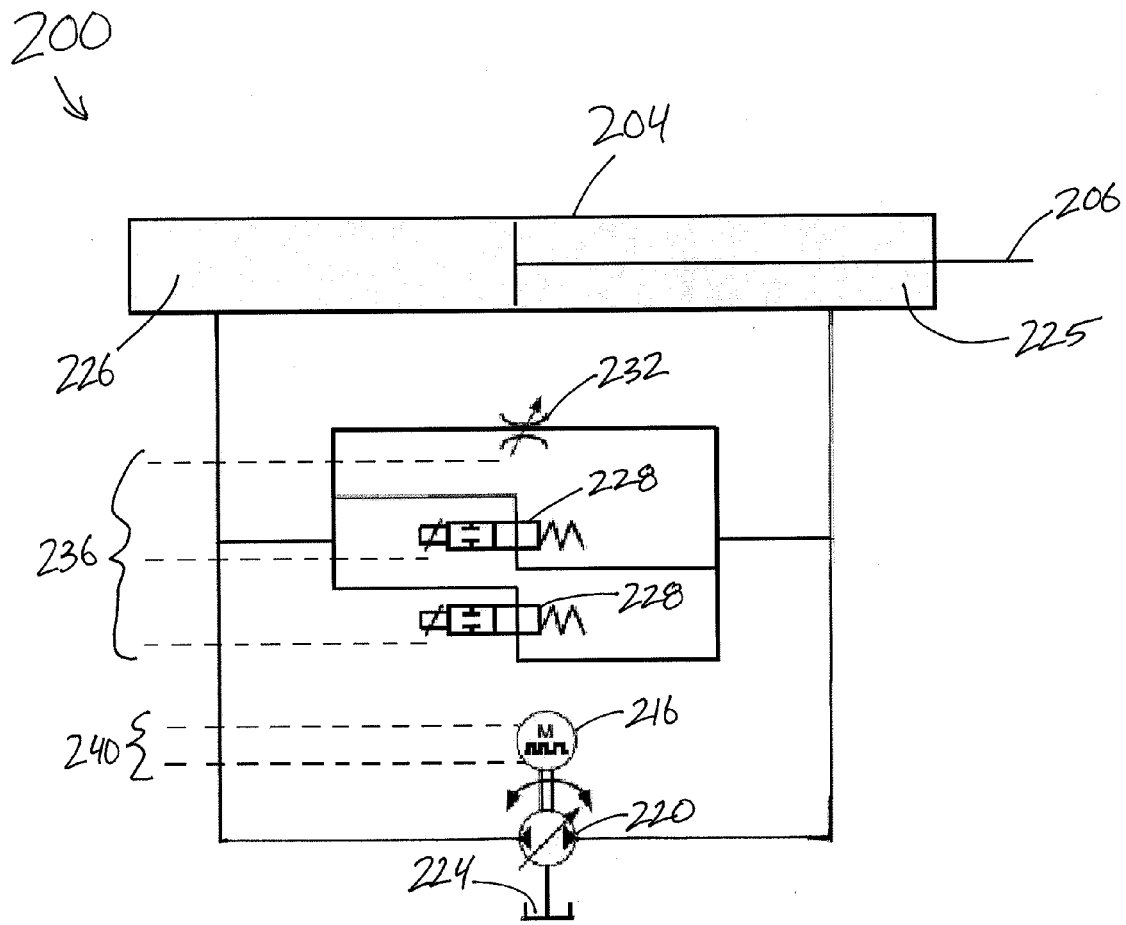
FIG. 3 is a hydraulic circuit diagram according to one embodiment showing a reversible variable speed motor and pump with a hydraulic actuator.

With reference to FIG. 3, the hydraulic steering assist assembly 200 is schematically illustrated as having an actuator 204 with only a single rod 206 adapted to be coupled to one of the steering linkages 18. The hydraulic steering assist assembly 200 includes a bi-directional motor 216 that drives a bi-directional pump 220 pumping hydraulic fluid from an internal reservoir 224 to either a first side 225 or a second side 226 of the hydraulic cylinder actuator 204. The hydraulic steering assist assembly 200 further includes a hydraulic valve 228 (shown with two valves in FIG. 3) and a variable orifice 232.

When the valves 228 and the orifice 232 are closed, pressure is capable of building on either side of the actuator 204 depending on the rotational direction of the motor 116 and the pump 120. Note, the term "closed" when referencing a hydraulic valve or orifice refers to a state that prevents the flow of fluid through the valve or orifice (i.e., a closed valve), and the term "open" refers to the state that allows for flow through the valve or orifice (i.e., an open valve). The bi-directional hydraulic pump 220 is operable to provide pressurized fluid to the first side 225 of the hydraulic actuator 104 to cause the actuator 204 to move and to assist the user in steering the vehicle in a first direction (e.g., turning right). Similarly, the bi-directional hydraulic pump 220 is operable to provide pressurized fluid to the second side 226 of the hydraulic actuator 204 to cause the actuator 204 to move and to assist the user in steering the vehicle in a second direction (e.g., turning left).

When the valve 228 or the orifice 232 are open, the high pressure system is short circuited (i.e., the first side 225 and the second side 226 of the actuator 204 are in fluid communication). With the first side 225 and the second side 226 of the actuator 204 in fluid communication, the actuator is able to operate as a viscous damper (i.e., transient forces transmitted to the steering linkages 18 will be dampened through the hydraulic actuator 204). The damping of the transient forces can be controlled through the metering of hydraulic fluid through the valve 228 and/or the variable orifice 232. The orifice 232 can provide a controlled metering of hydraulic fluid that improves system tuning. The damping of forces through the actuator 204 reduces the amount of transient forces applied to the mechanical steering assembly 14, improving the life of the mechanical components 18, 22, 26, 30. Valve and orifice control signals 236 and motor control signals 240 are provided from control system in the form of an electronic control unit 244 (FIG. 4).

Figure 4:
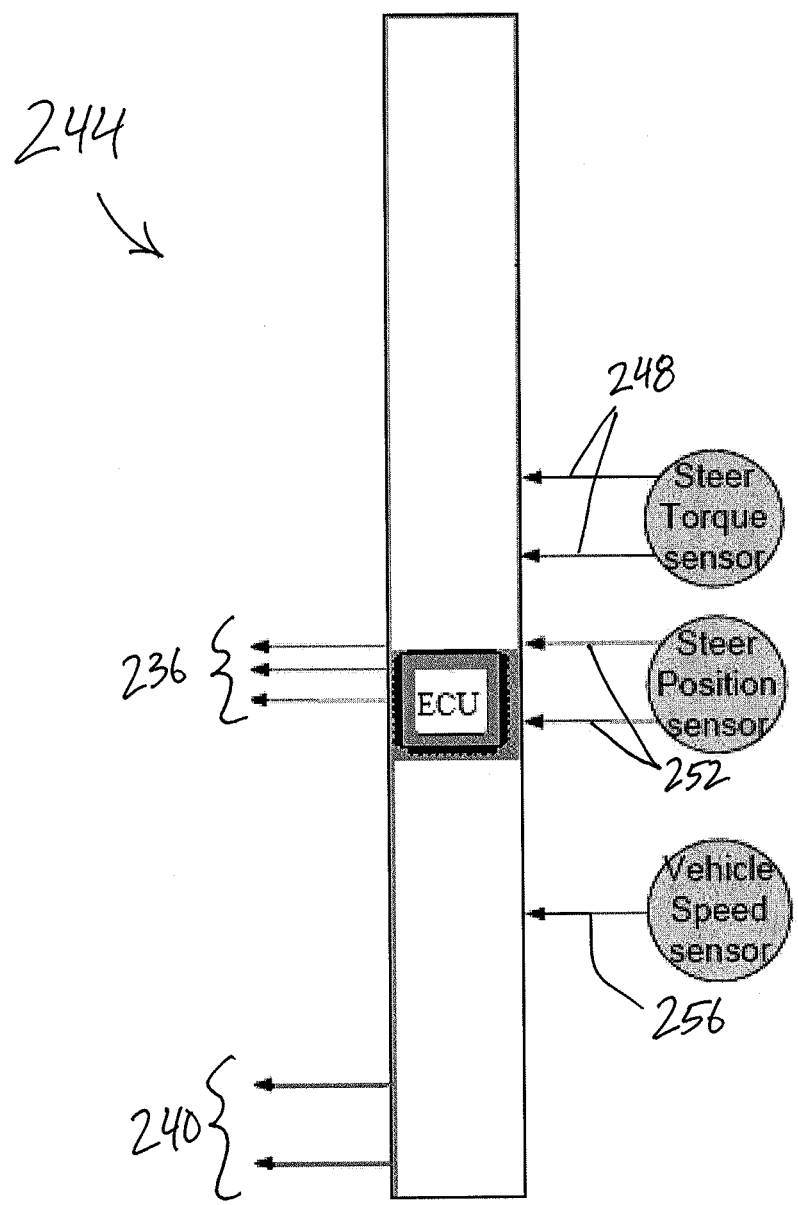
FIG. 4 is a control signal diagram showing an electronic control unit and input and output signals.

With reference to FIG. 4, the electronic control unit 244 receives input sensor signals 248, 252, 256, corresponding to the steering torque, steering shaft position, and vehicle speed, respectively. The input sensor signals 248, 252, 256 are processed in the control unit 244 according to knowledge well known in the art, which outputs the control signals 236, 240. The motor control signal 240 regulates the motor 216 speed and direction. The valve and orifice control signals 236 control the valves 228 to be open or closed and the metering of the hydraulic fluid through the orifice 232. The electronic control unit 244 can be programmed as desired or needed to output the control signals 236 and 240. In case of a system failure, the electronic control unit 244 detects the system failure and controls the valves, which are biased open, to open, thus preventing any system lock-up.

Figure 5:
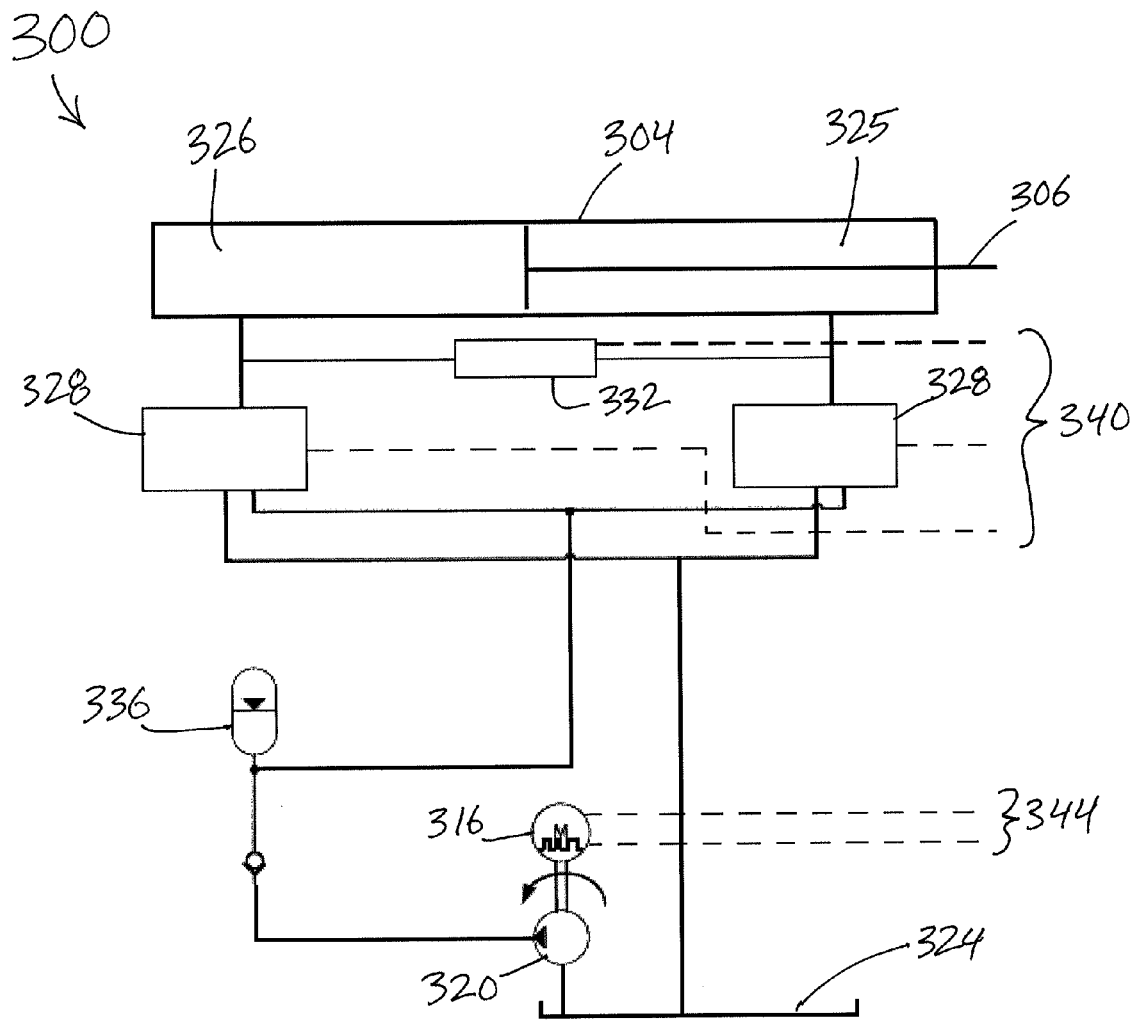
FIG. 5 is a hydraulic circuit diagram according to another embodiment showing a variable speed motor and pump, a hydraulic actuator, and a hydraulic accumulator.

With reference to FIG. 5, a hydraulic steering assist assembly 300 according to another embodiment of the invention is illustrated. The hydraulic steering assist assembly 300 includes a hydraulic actuator 304 having only a single rod 306 adapted to be coupled to one of the steering linkages 18 and having a first side 325 and a second side 326. The hydraulic steering assist assembly 300 further includes a variable speed motor 316 that drives a pump 320 pumping hydraulic fluid from a reservoir 324 to pressurize the hydraulic actuator 304. The pressurized hydraulic fluid from the pump 320 is stored in a hydraulic accumulator 336 provide instant pressure when needed by the actuator 304 for steering assistance (i.e., hydraulic pressure on-demand). The pressure in the hydraulic accumulator 336 is controlled by at least one valve 328 and/or metered by a variable damping valve 332. There are two valves 328, each coupled to the accumulator 336 and the reservoir 324. One of the valves 328 is in fluid communication with the first side 325 of the actuator 304, and the other valve 328 is in fluid communication with the second side 326 of the actuator 304.

Pressure is capable of building on either side of the actuator 304, subsequently providing a force to assist steering. To build pressure, the valves 328 are controlled so that high pressure fluid from the accumulator 336 is in fluid communication with one side of the actuator 304, while the other side of the actuator 304 is in fluid communication with the low pressure reservoir 324. The variable damping valve 332 is in fluid communication with both the first side 325 and the second side 326 of the actuator 304, such that transient forces transmitted to the steering linkages 18 will be dampened through the hydraulic actuator 304 (i.e., the actuator 304 acts as a viscous damper). The damping of the transient forces can be controlled through the metering of hydraulic fluid through the variable damping valve 332. Valve control signals 340 and motor control signals 344 are provided from an electronic control unit similar to the electronic control unit 244 shown in FIG. 4.

Figure 6:
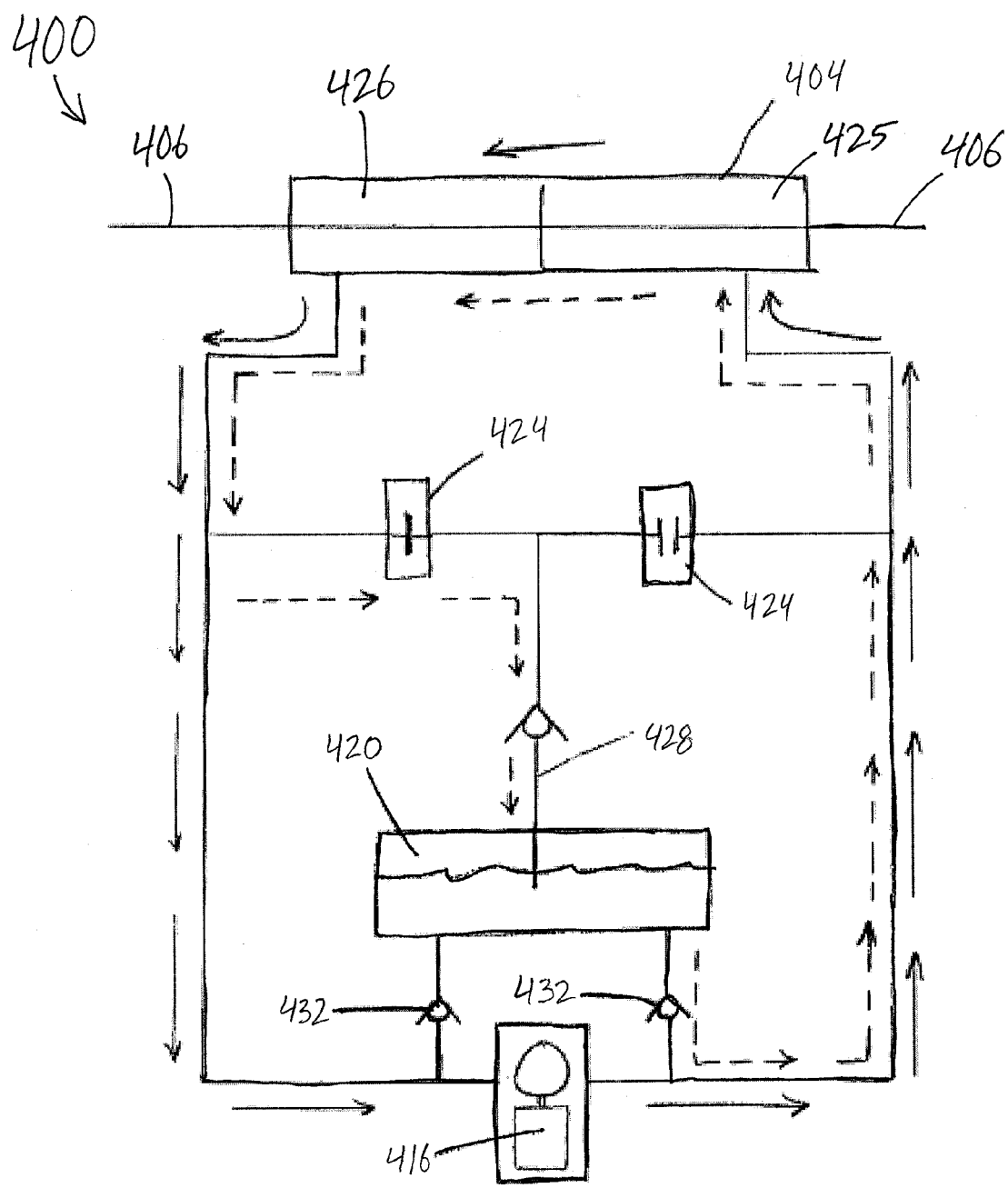
FIG. 6 is a hydraulic circuit diagram according to another embodiment showing a reversible variable speed motor and pump, a hydraulic actuator, and a bypass circuit.

With reference to FIG. 6, a hydraulic steering assist assembly 400 according to another embodiment of the invention is illustrated. The hydraulic steering assist assembly 400 includes a hydraulic actuator 404 having two rods 406, a first side 425 and a second side 426. The hydraulic steering assist assembly 400 further includes a bi-directional motor/pump 416 pumping hydraulic fluid from an internal reservoir 420 to either side of the actuator 404. The hydraulic steering assist assembly 400 further includes two PWM solenoid valves 424, one on each of the pressurized and non-pressurized sides of the actuator 404 along with a bypass circuit 428 running between the solenoid valves 424 and the system reservoir 420. Two check valves 432 connect the reservoir 420 with opposing sides of the bi-directional motor/pump 416.

The bi-direction motor/pump 416 supplies a source of pressurized fluid to one of the ends 425, 426 of the actuator 404 with the valves 424 closed (i.e., no flow through the valves 424) to build pressure in the actuator 404 and to moves the rods 406. This primary flow of pressurized fluid is illustrated in FIG. 6 with solid arrows. If a higher flow rate is required, corresponding to a high steering rate, one of the valves 424 can be opened to allow the return of pressurized fluid to the reservoir 420. This secondary flow of pressurized fluid is illustrated in FIG. 6 with broken arrows. Any residual pressure or flow volume on the lower pressure side of the actuator 404 can be taken up by the pump 416 or vented to the reservoir 420 as the rods 406 move through the desired stroke.

In a low steering rate event, the pressurized side of the actuator 404 has sufficient flow from the pump 416 to provide assist without being retarded by the non-pressurized side of the actuator 404. The non-pressurized side can vent to the reservoir 420 as the steering event and level of residual pressure dictates.

In a high steering rate event, it is possible for the user to steer the system faster than the pump is able to pump fluid, thereby restricting the high rate of steering. In this condition, the hydraulic bypass circuit 428 as illustrated in FIG. 6 is enabled. The bypass circuit allows fluid to flow from the reservoir, through the valve 432 and into the intake side of the actuator 404, and further allows fluid to flow from the outlet side of the actuator 404 through the valve 424 (on the left in FIG. 6), through the central valve (near 428) and into the reservoir. The bypass circuit 428 enables high rates of steering such as encountered in reflex steering or high rate free steering and to prevent the phenomenon commonly known as "catching the pump" when a driver steers faster than the base steering pump flow rate would normally allow.

Various features and advantages of the invention are set forth in the following claims.

What is claimed is:

1. A hydraulic steering assist assembly for a vehicle having a mechanical steering assembly operable by a user to steer the vehicle, the hydraulic steering assist assembly comprising:
    a hydraulic actuator adapted to be coupled to the mechanical steering assembly, the hydraulic actuator having a first side and a second side;
    a bi-directional hydraulic pump in fluid communication with the first side and the second side of the hydraulic actuator;
    a valve in fluid communication with the first side and the second side of the hydraulic actuator;
    a control system for controlling the bi-directional hydraulic pump and the valve, wherein the bi-directional hydraulic pump provides a pressurized fluid to the hydraulic actuator, which applies a force on the mechanical steering assembly to assist steering the vehicle; and
    a variable orifice in fluid communication with the first side and the second side of the hydraulic actuator;
    wherein the control system controls the variable orifice to meter the amount of hydraulic fluid that flows through the variable orifice.

2. The hydraulic steering assist assembly of claim 1, wherein the bi-directional hydraulic pump is operable to provide pressurized fluid to the first side of the hydraulic actuator to assist the user in steering the vehicle a first direction, and operable to provide pressurized fluid to the second side of the hydraulic actuator to assist the user in steering the vehicle a second direction.

3. The hydraulic steering assist assembly of claim 1, wherein the valve is selectively opened to place the first side and the second side of the hydraulic actuator in fluid communication, enabling the hydraulic actuator to operate as a viscous steering damper.

4. The hydraulic steering assist assembly of claim 1, wherein the variable orifice is selectively opened to place the first side and the second side of the hydraulic actuator in fluid communication, enabling the hydraulic actuator to operate as a viscous steering damper.

5. The hydraulic steering assist assembly of claim 1, wherein the valve is biased open.

6. The hydraulic steering assist assembly of claim 1, wherein the valve is in parallel with the hydraulic pump relative to the hydraulic actuator.

7. The hydraulic steering assist assembly of claim 1, wherein the control system controls the speed and rotational direction of the bi-directional hydraulic pump.

8. A hydraulic steering assist assembly for a vehicle having a mechanical steering assembly operable by a user to steer the vehicle, the hydraulic steering assist assembly comprising:
    a hydraulic actuator adapted to be coupled to the mechanical steering assembly, the hydraulic actuator having a first side and a second side;
    a reservoir containing a hydraulic fluid;
    a bi-directional hydraulic pump in fluid communication with the first side and the second side of the hydraulic actuator and the reservoir;
    a bypass circuit in fluid communication with the first side and the second side of the hydraulic actuator and the reservoir; and
    a control system for controlling the bi-directional hydraulic pump and the bypass circuit, wherein the bi-directional hydraulic pump provides a pressurized fluid to the hydraulic actuator, which applies a force on the mechanical steering assembly to assist steering the vehicle;
    wherein the bypass circuit is operable to enable steering at a high rate that would require a system flow rate greater than that associated with the capability of the bi-directional hydraulic pump.

9. The hydraulic steering assist assembly of claim 8, wherein the bypass circuit includes a first valve coupled between the first side of the actuator and the reservoir and a second valve coupled between the second side of the actuator and the reservoir.

10. The hydraulic steering assist assembly of claim 9, wherein the bypass circuit further includes a one-way valve positioned between the first side of the hydraulic actuator and the reservoir to substantially inhibit flow from the reservoir back through the bypass circuit.

11. The hydraulic steering assist assembly of claim 8, wherein the bi-directional hydraulic pump is operable to provide pressurized fluid to the first side of the hydraulic actuator to assist the user in steering the vehicle a first direction, and operable to provide pressurized fluid to the second side of the hydraulic actuator to assist the user in steering the vehicle a second direction.

* * * * *